US011247297B2

(12) United States Patent
Buldhaupt

(10) Patent No.: US 11,247,297 B2
(45) Date of Patent: Feb. 15, 2022

(54) METHODS OF WELDING USING ROTATING SHIELDING DEVICES

(71) Applicant: The Boeing Company, Chicago, IL (US)

(72) Inventor: Frederick W. Buldhaupt, South Prairie, WA (US)

(73) Assignee: The Boeing Company, Chicago, IL (US)

(*) Notice: Subject to any disclaimer, the term of this patent is extended or adjusted under 35 U.S.C. 154(b) by 454 days.

(21) Appl. No.: 16/289,301

(22) Filed: Feb. 28, 2019

(65) Prior Publication Data
US 2019/0193202 A1    Jun. 27, 2019

Related U.S. Application Data

(62) Division of application No. 14/593,969, filed on Jan. 9, 2015, now Pat. No. 10,265,801.

(51) Int. Cl.
*B23K 26/26* (2014.01)
*B23K 26/14* (2014.01)
*B23K 101/00* (2006.01)

(52) U.S. Cl.
CPC ............ *B23K 26/26* (2013.01); *B23K 26/147* (2013.01); *B23K 2101/001* (2018.08); *B23K 2101/006* (2018.08)

(58) Field of Classification Search
CPC .................. B23K 26/26; B23K 26/147; B23K 2201/001; B23K 2201/006; B23K 26/123;
(Continued)

(56) References Cited

U.S. PATENT DOCUMENTS

| 2,610,003 A | 9/1952 | Bond et al. |
| 5,070,628 A | 12/1991 | Zagar |

(Continued)

FOREIGN PATENT DOCUMENTS

| EP | 2647468 | 10/2013 |
| JP | 04-178294 | 6/1992 |
| JP | 2004106020 | 4/2004 |

OTHER PUBLICATIONS

Machine-generated English translation of JP 04-178294, downloaded from Japan Platform for Patent Information Sep. 28, 2018.
(Continued)

*Primary Examiner* — Ibrahime A Abraham
*Assistant Examiner* — Chris Q Liu
(74) *Attorney, Agent, or Firm* — Dascenzo Gates Intellectual Property Law, P.C.

(57) ABSTRACT

Methods of forming a weld joint using rotating shielding devices are disclosed. To form the weld joint, the rotating shielding device may be moved continuously along a seam formed between two structures being welded, so as to avoid having to remove the rotating shielding device during, for example, welding around corners. In this manner, disclosed methods of welding may improve efficiency of techniques such as vertical welding. During welding, rotating shielding devices may be coupled to a shielding gas supply, such that the shielding gas exits through an outlet formed in an axle of the rotating shielding device as the device is rotated and moved along the seam. The rotating shielding device may contain a plurality of partitions defining one or more chambers, the partitions and chambers being positioned between spaced-apart rotating portions, with the rotating shielding device configured to direct the shielding gas towards the weld pool during welding.

20 Claims, 7 Drawing Sheets

(58) Field of Classification Search
CPC .... B23K 26/125; B23K 26/28; B23K 26/282;
B23K 26/0823; B23K 9/162; B23K
9/164; B23K 26/1464; B23K 9/325;
B23K 26/14; B23K 26/142
USPC ........ 219/74, 121.12–121.14, 121.35, 121.6,
219/121.63–121.66, 121.84
See application file for complete search history.

(56) References Cited

U.S. PATENT DOCUMENTS

| | | | |
|---|---|---|---|
| 5,149,936 A | 9/1992 | Walton, II | |
| 5,578,227 A | 11/1996 | Rabinovich | |
| 5,601,225 A | 2/1997 | Wood et al. | |
| 8,152,441 B2 | 4/2012 | Hofmann | |
| 8,333,897 B2 | 12/2012 | Bialas et al. | |
| 2010/0176106 A1* | 7/2010 | Christensen | B23K 37/0264 219/137 R |
| 2012/0152373 A1 | 6/2012 | Morgan et al. | |
| 2015/0158129 A1* | 6/2015 | Matthews | B23K 37/0294 219/138 |

OTHER PUBLICATIONS

Machine-generated English translation of JP 2004106020, downloaded from Espacenet Oct. 13, 2016.
Machine-generated English translation of EP 2647468, downloaded from Espacenet.com Oct. 11, 2016.

* cited by examiner

METHODS OF WELDING USING ROTATING SHIELDING DEVICES

RELATED APPLICATION

This application is a divisional of and claims priority under 35 U.S.C. § 120 to U.S. patent application Ser. No. 14/593,969, which is entitled "ROTATING SHIELDING DEVICES," which was filed on Jan. 9, 2015, and the disclosure of which is hereby incorporated by reference.

FIELD

The present disclosure relates to rotating shielding devices and methods of welding.

BACKGROUND

Laser beam welding, also referred to as laser welding, is a welding technique used to join multiple pieces of metal through the use of a laser. The beam provides a concentrated heat source, allowing for narrow, deep welds and high welding rates. The laser beam is focused toward a seam or area which causes the materials to form change from solid to liquid (the molten, liquid area being referred to as a "weld pool") and, as the laser energy is removed, back to solid, thereby coupling the metal pieces together with a weld. Laser welding may be used to produce selective area spot welds and/or linear continuous seam welds. For example, laser welding may be performed to join two structures, with a continuous seam weld along the joint line, by moving the laser beam along the interface between the two structures. Laser welding may be performed in a flat plane (1G), horizontally (2G), vertically (3G), and/or overhead (4G).

Because of its speed, the process is frequently used in high volume applications, such as in the automotive or aerospace industries, but its utility is not limited to the same. The use of laser welding for manufacturing, for example, aircraft parts may be useful in reducing the weight of the resulting aircraft. For example, laser welding may be used in place of riveting when joining large metal fuselage parts to each other. These parts include, for example, stringers used in metal fuselages. Using laser welding may provide an advantage over other joining techniques, such as using rivets to mate structures together, because laser welding may result in lower weight parts.

However, laser welding is subject to contamination during the welding process. This contamination is caused mainly by nitrogen, oxygen, and/or water vapor present in the atmosphere (e.g., ambient air) in the proximity of the weld pool during laser welding. Reactions between these contaminants and the weld pool can create defects or imperfections in the resulting weld, such as porosity, excessive splatter, and/or oxidation (often visible as discoloration). For example, the presence of nitrogen in solidified steel can reduce the ductility, can negatively impact strength of the weld, and/or can cause cracking. In large amounts, nitrogen can also cause weld porosity. As a further example, excess oxygen in steel can combine with carbon to form carbon monoxide (CO), which can be trapped in the metal, thereby causing porosity. In addition, excess oxygen can combine with other elements in steel and form compounds that produce inclusions in the weld metal. When hydrogen, present in water vapor and oil, combines with either iron or aluminum, porosity can result and weld metal cracking may occur.

To combat these potential defects and imperfections, one manner in which air may be prevented from contacting the molten weld pool is to perform the laser welding in a vacuum. Although this type of process may be suitable for preventing certain contamination defects, vacuum environments may be impractical for some welding applications due to the size of the parts being welded. Another technique involves introducing an inert or semi-inert gas (referred to as a "shielding gas") to prevent ambient air from contacting the weld pool until it is cool enough. For example, ambient air may be displaced by a shielding gas in order to prevent atmospheric contamination of the molten material. Shielding gases such as argon, helium, and carbon dioxide have been used in laser welding applications to prevent contamination of the weld pool. However, in certain laser welding techniques, such as vertical laser welding, welding speeds are limited by existing devices and methods for applying shielding gases to the weld pool. There thus remains a need for an improved device and method for providing a shielding gas during welding techniques such as laser welding.

SUMMARY

Disclosed rotating shielding devices for applying a shielding gas to a weld pool during laser welding may, for example, enable continuous vertical welds without requiring removal of the device (which would interrupt the welding process, as in prior art methods). As the rotating shielding device rotates along the weld joint, shielding gas may be directed towards the weld pool, as the joint is being welded. The rotating shielding device may move along the weld joint simultaneously with the laser focus head, thereby dispensing shielding gas to the weld pool as it progresses along the weld joint being formed. Disclosed rotating shielding devices may be configured to, for example, roll along three-dimensional corners as may be required when performing vertical welds.

According to the present disclosure, one example of a rotating shielding device for laser welding a seam between a first structure and a second structure may include a body configured to straddle the seam and an axle extending through the body, wherein the body is rotationally coupled to the axle. The axle may include an inlet for receiving shielding gas and an outlet positioned to direct the shielding gas at the seam when the body is caused to roll along the first structure and the second structure. The body may include a first rotating portion and a second rotating portion spaced apart from the first rotating portion, and a central portion positioned between and interconnecting the first rotating portion and the second rotating portion. The first rotating portion may include a first contact surface for engaging and rolling along the first structure and the second rotating portion may include a second contact surface for engaging and rolling along the second structure.

Methods of welding (e.g., methods of forming a weld joint) using such rotating shielding devices are also disclosed. For example, one method may include rolling the first rotating portion and the second rotating portion of a presently disclosed rotating shielding device along a first structure and a second structure, respectively, supplying shielding gas to the inlet of the axle, and forming a weld joint along the seam between the first structure and the second structure.

Furthermore, methods of welding around a three-dimensional corner are disclosed where the shielding device need not be removed and replaced during welding. For example, one method of forming a weld joint along an interface between a first structure and a second structure may include positioning the first structure adjacent the second structure to form the interface, supplying a shielding gas to a shielding device, welding the interface along the first structure and the second structure, and, concurrently with the welding, moving the shielding device along the interface as the weld joint is being formed along the interface, wherein, during the moving, the shielding device remains in contact with the first structure and the second structure for the duration of formation of the weld joint. The first structure and the second structure may be positioned such that the interface (e.g., the seam to be welded) forms a three-dimensional corner. For example, the first structure may include a first face and a second face, the first face and the second face being arranged at a first angle with respect to one another. The second structure may include a third face and a fourth face, the third face and the fourth face being arranged at a second angle with respect to one another. The positioning the first structure adjacent the second structure may include aligning the first structure and the second structure such that the first face and the third face are adjacent each other and such that the second face and the fourth face are adjacent each other, such that the interface is formed continuously along the first and third faces and continues along the second and fourth faces, thereby forming a three-dimensional corner.

DESCRIPTION

Figure 1:
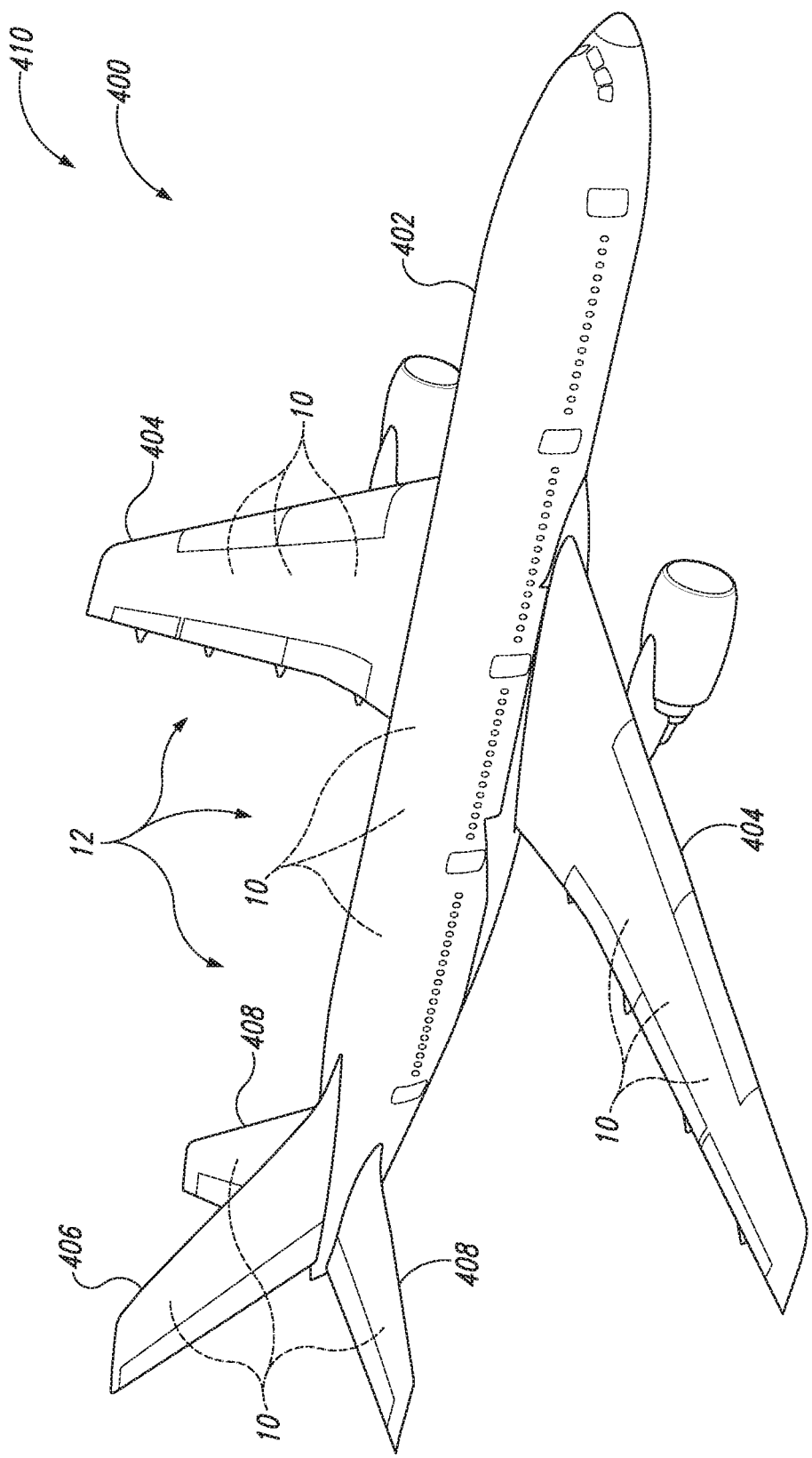
FIG. 1 is a perspective view of an illustrative, non-exclusive example of an aircraft that may include one or more weld joints and/or one or more composite parts manufactured on tooling manufactured according to the present disclosure.

Rotating shielding devices and methods of welding are disclosed herein. Such presently disclosed devices and methods may be used in manufacturing processes, such as in welding two or more pieces of material together. In some examples, such welding may be used to join large pieces of tooling together, such as invar tooling to form a mold for manufacturing composite structures for use in manufacturing an apparatus, such as apparatus 410, as schematically Illustrated in FIG. 1. Apparatus 410 may be constructed from one or more composite structures 12 and/or one or more weld joints 10, which may be present in apparatus 410 itself, and/or may be present in tooling used to form one or more composite structures 12 included in apparatus 410. For example, one or more weld joints 10 constructed utilizing devices and/or methods according to the present disclosure may be included in one or more of seat tracks, joints between two or more panels (e.g., fiber composite panels and/or honeycomb cores), ribs, spars, stringers, and/or frames within aircraft 400.

Apparatus 410 may be provided in the form of an aircraft 400; however, other apparatuses 410 are within the scope of the present disclosure, and the present disclosure is not limited to aircraft and aircraft applications. For example, as illustrative, non-exclusive examples, other apparatuses 410 that may be constructed of composite structures 12 and/or that may include weld joints 10 include (but are not limited to) spacecraft, watercraft, land vehicles, wind turbines, structural towers and masts, bridges, etc. Moreover, aircraft 400 may take any suitable form, including commercial aircraft, military aircraft, private aircraft, or any other suitable aircraft. While FIG. 1 illustrates aircraft 400 in the form of a fixed wing aircraft, other types and configurations of aircraft are within the scope of aircraft 400 according to the present disclosure, including (but not limited to) helicopters.

Aircraft 400 may include a fuselage 402, which also may be referred to herein as a barrel 402, and which generally corresponds to the main body of aircraft 400 for holding passengers, crew, cargo, and/or equipment, for example, depending on the particular configuration and/or function of an aircraft 400. Typically, although not required, the fuselage 402 of an aircraft 400 is elongate and somewhat cylindrical or tubular. In some embodiments, the fuselage 402 may be constructed of multiple sections that are longitudinally spaced along the fuselage 402 and operatively coupled together to define the fuselage 402.

Aircraft 400 also may include wings 404, horizontal stabilizers 408, and a vertical stabilizer 406, each of which may be constructed as a unitary structure or in subsections that are subsequently assembled together. One or more of a fuselage 402, a wing 404, a horizontal stabilizer 408, a vertical stabilizer 406, or a structural subsection thereof may be constructed of and/or may be described as a composite structure 12, where said composite structure 12 may be formed on tooling welded according to the present disclosure. Additionally or alternatively, one or more of a fuselage 402, a wing 404, a horizontal stabilizer 408, a vertical stabilizer 406, or a structural subsection thereof may include one or more weld joints 10 manufactured according to the present disclosure.

Figure 2:
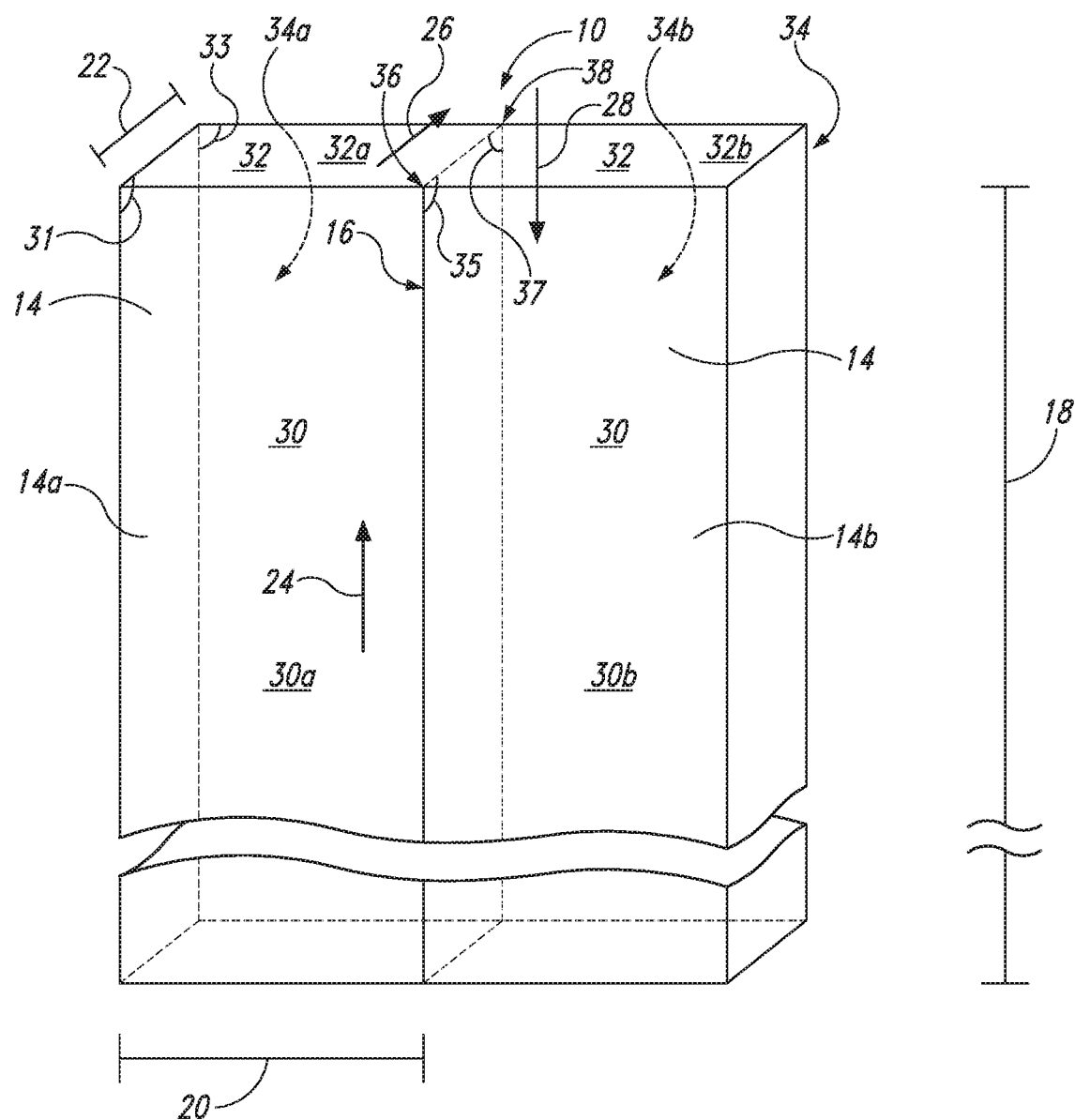
FIG. 2 is a schematic representation of an illustrative, non-exclusive example of a weld joint between two structures.

FIG. 2, which is not drawn to scale, is a schematic representation of a weld joint 10 that may be formed according to methods and devices of the present disclosure. As used herein, a "weld joint" refers to an assembly of two or more members, or structures, 14 (e.g., first structure 14*a* and second structure 14*b*) that are welded together along a joint, or interface, 16 (which also may be referred to herein as a seam 16) of the two structures 14. Structures 14 may be constructed of sheet material, for example, having a length 18 and a width 20 that are substantially greater than a thickness 22. In some examples, structures 14 may be constructed of generally planar sheet material. Additionally or alternatively, structures 14 may be constructed of sheet material that is not planar. In some examples, structures 14 may be large pieces. For example, structures 14 may have a length 18 of at least 10 feet (3.05 m), at least 20 feet (6.1 m), at least 30 feet (9.14 m), at least 40 feet (12.19 m), at least 50 feet (15.24 m), at least 60 feet (18.29 m), at least 70 feet (21.34 m), at least 80 feet (24.38 m), at least 90 feet (27.43 m), and/or 100 feet (30.48 m) or greater. Similarly, structures 14 may have a width 20 of at least 10 feet (3.05 m), at least 20 feet (6.1 m), at least 30 feet (9.14 m), at least 40 feet (12.19 m), at least 50 feet (15.24 m), at least 60 feet (18.29 m), at least 70 feet (21.34 m), at least 80 feet (24.38 m), at least 90 feet (27.43 m), and/or 100 feet (30.48 m) or greater. Illustrative, non-exclusive examples of materials from which structures 14, and thus weld joints 10, may be constructed include (but are not limited to) metals, such as titanium, titanium alloys, aluminum, aluminum alloys, magnesium, magnesium alloys, zinc, zinc alloys, nickel, nickel alloys (e.g., invar), iron, iron alloys, and steels (e.g., carbon steels, stainless steels), as well as weldable plastics and/or other materials. Any suitable number of structures 14 may be welded together to define a weld joint 10.

Weld joint 10 of FIG. 2 is oriented as a vertical weld (which may be referred to as a 3G weld), but other orientations are also within the scope of the present disclosure. For example, weld joint 10 may be a flat weld (1G), a horizontal weld (2G), and/or an overhead weld (4G). As shown in FIG. 2, structures 14 (e.g., first structure 14a and second structure 14b) may be butted up against one another at seam 16. For example, structures 14 may be aligned and positioned with respect to one another such that their front surfaces 30, top surfaces 32, and/or rear surfaces 34 are aligned with one another. Each of the structures 14 may be identical to one another in some examples. In other examples, one or more of the structures 14 may be different in size or shape from one another. In some examples, weld joint 10 may be formed between two structures 14. In some examples, weld joint 10 may be formed between three or more structures 14, or along a single structure 14.

In first structure 14a, front surface 30 may be arranged at a first angle 31 with respect to top surface 32. Similarly, top surface 32 may be arranged at a second angle 33 with respect to rear surface 34. First angle 31 and second angle 33 may be acute, obtuse, or a 90° angle. First angle 31 and second angle 33 may be equal to each other, or may be different from each other. Similarly, in second structure 14b, front surface 30 may be arranged at a third angle 35 with respect to top surface 32, and top surface 32 may be arranged at a fourth angle 37 with respect to rear surface 34. Third angle 35 and fourth angle 37 may be acute, obtuse, or a 90° angle. Third angle 35 and fourth angle 37 may be equal to each other, or may be different from each other. Thus, when first structure 14a and second structure 14b are positioned with respect to one another, they may be arranged to form a three dimensional corner or corners, such as a corner 36 formed by front surfaces 30 and top surfaces 32, and/or corner 38 formed by top surfaces 32 and rear surfaces 34.

Once positioned adjacent one another, structures 14 may be welded together along seam 16 to form weld joint 10. Weld joint 10 may be formed in the direction shown by arrows 24, 26, 28 (e.g., vertically up front surface 30 of structures 14 along arrow 24, across top surface 32 of structures 14 along arrow 26, and vertically downward along rear surface 34 of structures 14 along arrow 28). Thus, the weld joint 10 may be formed in two or more directions (e.g., up and then down) and/or in two different planes (e.g., along front surfaces 30 and along top surfaces 32). Weld joint 10 may be formed by any suitable welding technique, such as via laser welding, gas metal arc welding (e.g., MIG welding), arc welding (e.g., stick welding), flux-cored welding and/or electroslag welding. Laser welding will serve as the primary example in the present disclosure, but the disclosure is not limited to the same.

Figure 3:
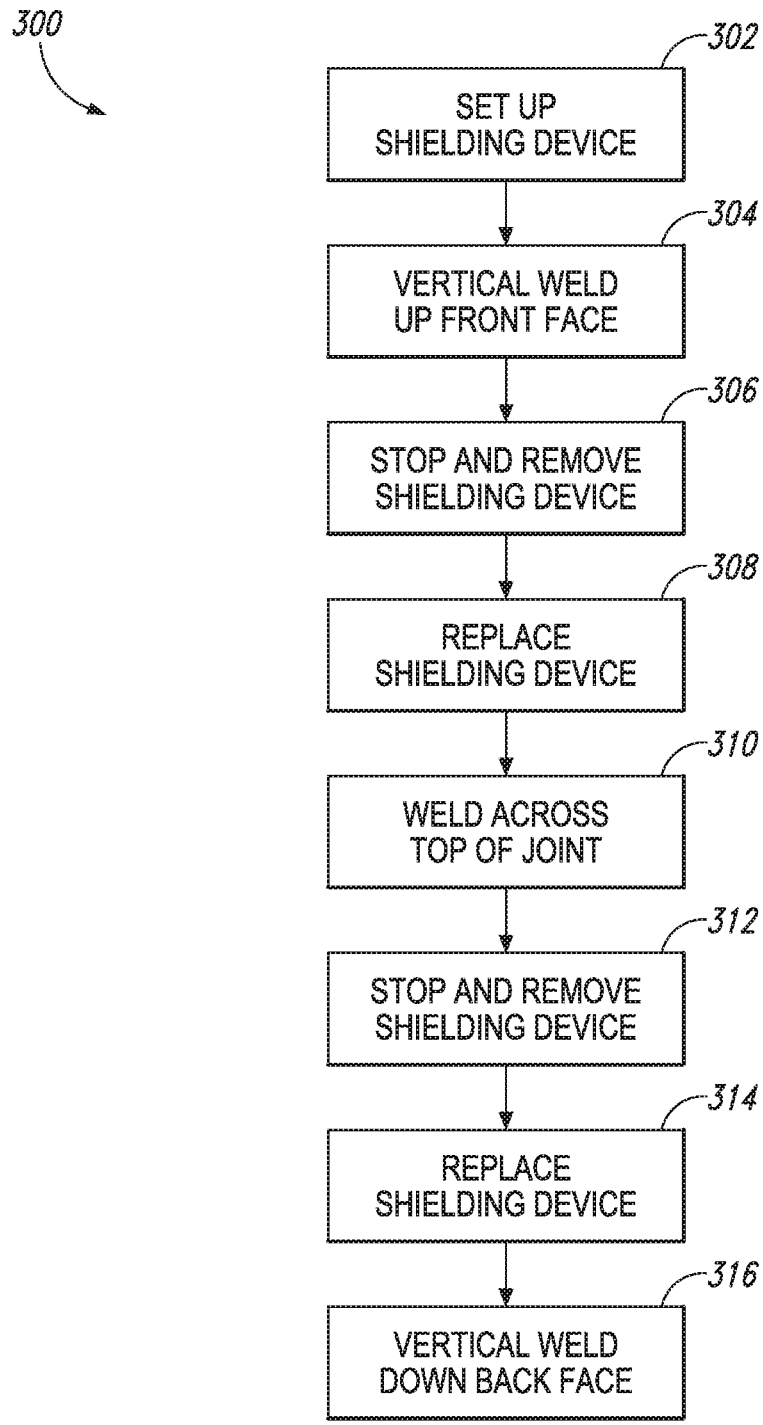
FIG. 3 is a schematic flow diagram of a prior art method of performing a vertical weld.

In laser welding (which also may be referred to as laser beam welding), a shielding gas may be used to shield the weld pool from contamination from ambient air. Conventional shielding devices and methods are well-suited for welding in a flat plane (e.g., 1G welding), however, for vertical welding (e.g., continuous welding in the directions along arrows 24, 26, and 28 in FIG. 2), conventional shielding devices generally must be removed and replaced at each junction or corner between surfaces of a structure 14. FIG. 3 shows a flow diagram of a prior art method 300 of creating a vertical weld, such as weld joint 10 between structures 14 of FIG. 2. A gas shielding device is set up and positioned at the start of the weld joint (e.g., weld joint 10 of FIG. 2) at 302. A vertical weld is formed up the front of the structures (e.g., along arrow 24 on front surface 30 of structures 14 of FIG. 2) at 304. At the top of the weld joint (e.g., at corner 36 between front surface 30 and top surface 32 in FIG. 2), the welding is stopped and the shielding device is removed at 306. The shielding device is re-oriented and replaced at 308 due to the change in direction of the weld because conventional shielding devices are not capable of shielding along a continuous weld that turns a corner (such as a continuous weld joint 10 of FIG. 2 that turns a three-dimensional corner at corner 36 between front surface 30 and top surface 32 of structures 14).

Next, the weld joint is continued across the top of the joint at 310 (e.g., the weld joint 10 is continued along arrow 26, across top surface 32 of structures 14 of FIG. 2). At the rear of the structures, the welding is stopped again and the shielding device is again removed at 312 (e.g., at a corner 38 between top surface 32 and rear surface 34 of structures 14 in FIG. 2). The shielding device is again re-oriented and replaced at 314 due to another change in direction of the weld (e.g., at the corner formed at corner 38 between top surface 32 and rear surface 34 of structures 14 of FIG. 2). Finally, the weld is continued down the rear of the structures (e.g., along arrow 28, down rear surface 34 of structures 14 of FIG. 2) at 316 until the weld is complete. Thus, prior art welding methods and prior art shielding devices are not configured to produce a continuous weld that changes directions, such as in the vertical weld joint 10 of FIG. 2.

Figure 4:
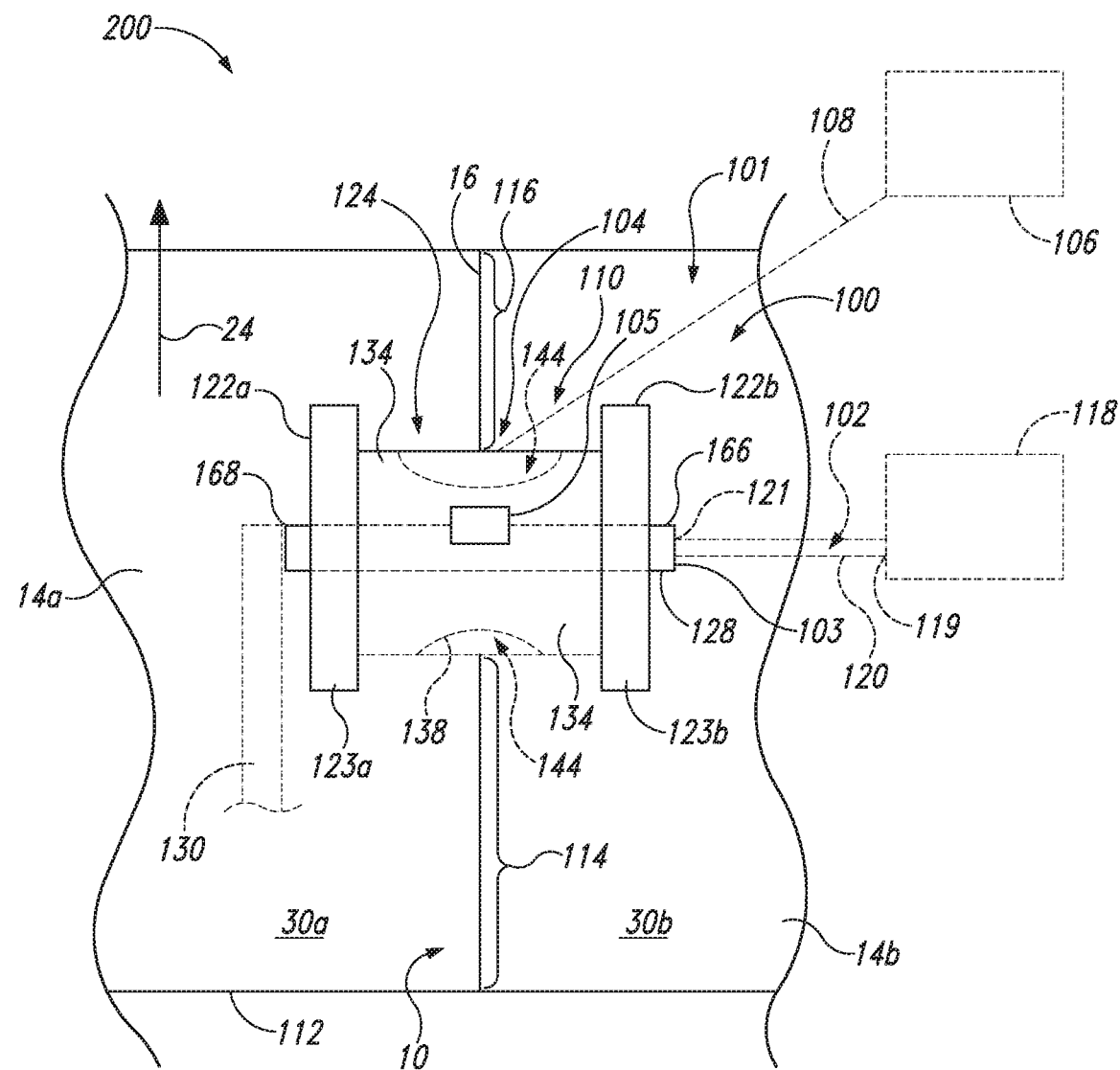
FIG. 4 is a schematic representation of illustrative, non-exclusive examples of a rotating shielding device and systems according to the present disclosure.

Turning now to FIGS. 4-8, illustrative non-exclusive examples of shielding devices 100 (which also may be referred to herein as rotating shielding devices 100 or gas shielding devices 100) and systems 200 according to the present disclosure are illustrated. In contrast to the prior art method of FIG. 3, the presently disclosed rotating shielding devices 100 may be configured to apply a shielding gas continuously along a weld joint that changes directions and/or turns three-dimensional corners (e.g., along weld joint 10 of FIG. 2) without requiring removal and replacement of rotating shielding device 100 as the weld is performed (e.g., along arrows 24, 26, 28). Where appropriate, the reference numerals from the schematic illustration of FIG. 4 are used to designate corresponding parts of FIGS. 5-8; however, the examples of FIGS. 5-8 are non-exclusive and do not limit the illustrated shielding devices to the illustrated embodiments. That is, disclosed rotating shielding devices are not limited to the specific embodiments of the illustrated FIGS. 5-8, and may incorporate any number of the various aspects, configurations, characteristics, properties, etc. of shielding that are illustrated in and discussed with reference to the schematic representations of FIG. 4 and/or the embodiments of FIGS. 5-8, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to each of FIGS. 5-8; however, it is within the scope of the present disclosure that the previously discussed features, variants, etc. may be utilized with each other.

FIG. 4 shows a schematic representation of illustrative, non-exclusive examples of rotating shielding devices 100 and systems 200 according to the present disclosure. Rotating shielding devices 100 may be configured to apply a shielding gas 102 to a weld pool 104 of weld joint 10 as it is in the process of being formed. For example, weld joint 10 may be a continuous seam weld joint 10 that joins first structure 14a to second structure 14b at a seam 16 between first structure 14a and second structure 14b. Weld joint 10 may be a weld joint that is formed starting at a lower end 112 of structures 14a, 14b, and is formed, for example, moving along surfaces 30a, 30b of structures 14a, 14b, along arrow 24. Weld joint 10 is shown in progress in FIG. 4, with a first portion 114 of weld joint 10 having been completed (e.g., welded) and a second portion 116 of weld joint 10 still to be completed.

In addition to rotating shielding devices 100, systems 200 may include a laser beam welding device 106 that may be configured to project a laser beam 108 at seam 16 of structures 14a, 14b, in order to form a laser beam focus head 110 at a point along seam 16, thereby forming weld pool 104. Laser beam 108 and rotating shielding device 100 may be moved along seam 16, thereby causing weld pool 104 to move along seam 16 accordingly, as weld joint 10 is formed. In other words, laser beam welding device 106 may be positioned relative to seam 16 such that laser beam welding device 106 is configured to deliver laser beam 108 to effectuate a laser weld joint along seam 16.

Rotating shielding device 100 generally may be configured to shield weld pool 104 from contamination (e.g., ambient air), such as by applying shielding gas 102 to weld pool 104, thereby substantially preventing ambient air from contacting weld pool 104. To this end, systems 200 may include a supply 118 of shielding gas 102 that may be operatively coupled to rotating shielding device 100, such as via a supply tube 120 (which also may be referred to herein as a shielding gas supply tube 120). Shielding gas 102 may be supplied from supply 118, traveling through supply tube 120, to rotating shielding device 100, which may be configured to release shielding gas 102 in the vicinity of weld pool 104. For example, supply tube 120 may include a first end 119 coupled to shielding gas supply 118 and a second end 121 coupled to, for example, an inlet 103 of an axle 128 of rotating shielding device 100.

Rotating shielding device 100 may be configured to be moved along weld joint 10 concurrently as laser beam focus head 110 is moved, such that rotating shielding device 100 remains adjacent weld pool 104 as weld joint 10 is being formed. In this manner, shielding gas 102 may be supplied to weld pool 104 on a continuous or high-frequency basis to at least substantially prevent contamination from impacting the resulting weld joint 10. Shielding gas 102 and shielding gas supply 118 may include any suitable shielding gas. Suitable shielding gases include inert and/or semi-inert gases such as helium, argon, and/or carbon dioxide. Additionally or alternatively, suitable shielding gases may include one or more of oxygen, nitrogen, hydrogen, nitric oxide, sulfur hexafluoride, and dicholorofluoromethane. Other shielding gases or fluids are also within the scope of this disclosure.

Rotating shielding device 100 generally may include a body 101 configured to straddle seam 16 and an axle 128 extending through body 101. Body 101 may be rotationally coupled to axle 128, and axle 128 may include an inlet 103 for receiving shielding gas 102 and an outlet 105 positioned to direct the shielding gas at seam 16 when body 101 is caused to roll along structures 14a, 14b. Body 101 may include one or more rotating portions 122, a central portion 124, and/or one or more frame members 130. Rotating portions 122 may include a first rotating portion 122a axially spaced apart from a second rotating portion 122b, which may each be configured to rotate about axle 128. Rotating portions 122a, 122b may be interconnected by central portion 124 (e.g., central portion 124 may be positioned between first rotating portion 122a and second rotating portion 122b).

Rotating portions 122 may be configured to rotate about axle 128 when rotating shielding device 100 is moved as weld joint 10 is being formed. For example, rotating portions 122 may be coupled to and/or in contact with structures 14a, 14b, and travel along structures 14a, 14b (e.g., along front surfaces 30a, 30b, top surfaces 32a, 32b, and/or rear surfaces 34a, 34b of FIG. 2), such as by engaging and being rolled along structures 14a, 14b as weld joint 10 is being formed. In some examples, when rotating shielding device 100 is positioned with respect to first structure 14a and second structure 14b, a first contact surface 123a of first rotating portion 122a is in contact with a portion of first structure 14a and a second contact surface 123b of second rotating portion 122b is in contact with a portion of second structure 14b. Thus, rotating shielding device 100 can be positioned with central portion 124 positioned over seam 16 (e.g., body 101 may be positioned such that it is straddling seam 16) between first structure 14a and second structure 14b. Contact surfaces 123a, 123b of rotating portions 122a, 122b may remain in contact with respective structures 14a, 14b as rotating shielding device 100 is rotated and moved along seam 16 to form the weld joint.

Central portion 124 may include at least one partition 134 extending axially between first rotating portion 122a and second rotating portion 122b, and extending radially from adjacent axle 128. Central portion 124 may be configured to interconnect first and second rotating portions 122a, 122b, such that rolling of first and second rotating portions 122a, 122b along first and second structures 14a, 14b, respectively, in turn causes rotation of central portion 124, such that partitions 134 rotate along with first and second rotating portions 122a, 122b, thereby creating a paddle-wheel motion.

In some examples of rotating shielding device 100, partitions 134 may extend radially from adjacent axle 128 to a curved edge 138 (which also may be referred to herein as a cutout portion 138). In some examples, each partition 134 and/or curved edge 138 may be configured so as to not extend beyond first contact surface 123a or second contact surface 123b. In other words, partitions 134 and/or curved edges 138 of partitions 134 may extend radially from a position adjacent axle 128, but may stop short of contact surfaces 123a, 123b, such that partitions 134 and/or curved edges 138 do not break an imaginary three-dimensional surface area defined by and between first contact surface 123a and second contact surface 123b (e.g., an imaginary cylindrical surface area is defined by and between first contact surface 123a and second contact surface 123b if first and second rotating portions 122a, 122b are circular). Each curved edge 138 may be configured to create an open space 144 configured to allow transmission of a laser beam to seam 16 when body 101 is rolling along first structure 14a and second structure 14b. In this manner, as body 101 of rotating shielding device 100 is rotated, central portion 124 may be configured to allow passage of a laser beam into open space 144, such that partitions 134 do not block the laser beam focus head from accessing seam 16 as the partitions 134 rotate about axle 128.

Axle 128 may be a hollow axle, such that an interior space is configured to receive shielding gas 102 through inlet 103, which may be a first end 168 of axle 128. Outlet 105 may be, for example, one or more holes formed in axle 128 that permit shielding gas 102 from within axle 128 to exit axle 128. In one specific example, outlet 105 may be a slot formed in axle 128, such as an axially extending slot. In some examples, axle 128 may be closed off at a second end 166 to prevent shielding gas 102 from exiting axle 128 other than through outlet 105. In other examples, second end 166 may serve as outlet 105.

One or more frame members 130 may be configured to move rotating shielding device 100. For example, frame members 130 (which also may be referred to herein as support frame 130) may be operatively coupled to axle 128 and/or body 101 in such a way that exerting a force on the frame members 130 (e.g., pushing frame members 130, pulling frame members 130, squeezing frame members 130, and/or otherwise moving and/or exerting force on frame members 130) causes movement of rotating shielding device 100 (e.g., rotation of first and second rotating portions 122a, 122b, which may be configured to result in travel of rotating shielding device 100 along weld joint 10 in one or more directions and/or planes). For example, frame members 130 may be configured to restrict rotation of axle 128 to maintain outlet 105 in position to direct the shielding gas at seam 16 as first rotating portion 122a and second rotating portion 122b are caused to roll along first structure 14a and second structure 14b. Frame members 130 may be manually operated and/or may be coupled to a robotic device or other machine configured to control movement of rotating shielding device 100.

Systems 200 and/or rotating shielding devices 100 may be used to supply shielding gas 102 to any seam being welded. Similarly, systems 200 and/or rotating shielding devices 100 may be used to form or create any weld joint between structures 14a, 14b, thereby creating a resulting welded part. Resulting welded parts may include tooling for a mold, such as a mold for a composite part for an aircraft, an aircraft, an aircraft component, an automotive component, an automobile, a spacecraft, a spacecraft component, a watercraft, a watercraft component, a land vehicle, a land vehicle component, a wind turbine, a wind turbine component, a structural tower, a structural tower component, a mast, a mast component, a bridge, and/or a bridge component.

Figure 5:
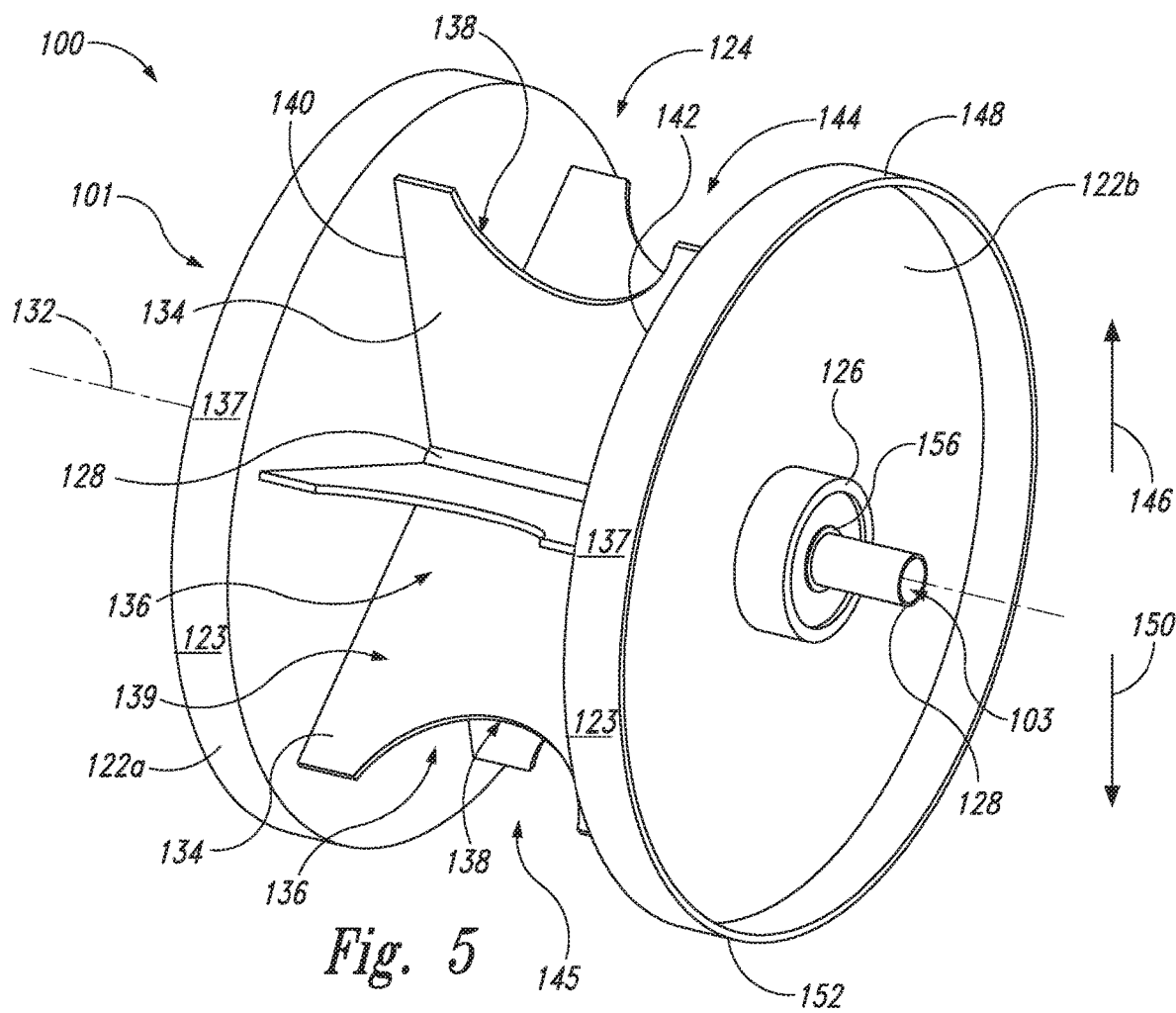
FIG. 5 is a perspective view of an illustrative, non-exclusive example of a rotating shielding device according to the present disclosure.

FIG. 5 shows a perspective view of a non-exclusive example of a rotating shielding device 100 according to the present disclosure. Rotating shielding device 100 of FIG. 5 generally includes a body 101 configured to rotate about an axle 128 extending therethrough. Body 101 may include two rotating portions 122 (e.g., first rotating portion 122a and second rotating portion 122b) concentrically aligned with each other and axially separated from each other along a central axis 132 by a central portion 124, which interconnects first rotating portion 122a and second rotating portion 122b. First rotating portion 122a and second rotating portion 122b may be of identical heights (e.g., if first and second rotating portions 122a, 122b are polygonal) or diameters (e.g., if first and second rotating portions 122a, 122b are circular, as shown in FIG. 5) in some examples.

Central portion 124 may include a plurality of paddles, or partitions, 134, that may be configured to divide central portion 124 into a plurality of chambers 136, each respective chamber 136 being defined by a respective two adjacent partitions 134. Each respective chamber 136 may define a chamber volume 139 between axle 128, first rotating portion 122a, second rotating portion 122b, and the respective two adjacent partitions 134. Each chamber 136 may be configured to receive a volume, or "dose" of shielding gas into the chamber (e.g., via an outlet of axle 128), temporarily partially enclosing the dose of shielding gas within the chamber, in order to direct the shielding gas towards the weld pool as a weld joint is being formed. As rotating shielding device 100 is rotated, central portion 124 is also rotated such that as a given chamber 136 is rotated away from the weld pool, the next adjacent chamber 136 is simultaneously rotated into position to deliver another dose of shielding gas to the weld pool.

Each of the plurality of partitions 134 may extend axially between first rotating portion 122a and second rotating portion 122b (e.g., from a first end 140 adjacent or contacting first rotating portion 122a to a second end 142 adjacent or contacting second rotating portion 122b). Each of the plurality of partitions 134 may extend radially outward from adjacent axle 128. A first and second contact surface 123a, 123b positioned at a perimeter 137 of rotating portions 122 may serve as an outer boundary for partitions 134, such that partitions 134 do not extend radially beyond first and second contact surfaces 123a, 123b. Partitions 134 may be equally spaced about central axis 132 in some examples. In other examples, partitions 134 may be unevenly spaced around central axis 132.

Any number of partitions 134 may be included in rotating shielding device 100. For example, some rotating shielding devices 100 may include one partition 134, up to two partitions 134, up to three partitions 134, up to four partitions 134, up to five partitions 134, up to six partitions 134, up to seven partitions 134, up to eight partitions 134, up to nine partitions 134, up to ten partitions 134, or more than ten partitions 134. The number of chambers 136 formed by partitions 134 is generally equal to the number of partitions 134. For example, a rotating shielding device 100 that includes two partitions 134 may have a central portion 124 that is divided into two chambers 136. In another example, a rotating shielding device 100 that includes six partitions 134 may have a central portion 124 that is divided into six chambers 136.

Each partition 134 may include a cutout portion 138, or curved edge 138, facing outward from axle 128. Such curved edges 138 may be configured to create an open space 144 through which a laser beam may be projected onto structures (e.g., structures 14a, 14b of FIG. 4) positioned behind rotating shielding device 100, such that a laser beam from a laser welding device (e.g., laser beam welding device 106 of FIG. 4) may be projected onto the seam between two or more structures to be welded such that the laser beam does not intersect rotating shielding device 100. In this manner, rotating shielding device 100 may be positioned adjacent a weld pool, such that a respective one of the plurality of chambers 136 is configured to open facing the weld pool at a given time. Rotating shielding device 100 may be configured to trail, or follow, the laser beam focus head projected by the laser welding device. For example, if rotating shielding device 100 is forming a weld and being moved in the direction indicated by arrow 146 (e.g., upwards along structures being welded), a laser beam may be projected into an open space 144 adjacent an upper end 148 of rotating shielding device 100. On the other hand, if rotating shielding device 100 is forming a weld and being moved in the direction indicated by arrow 150 (e.g., downwards along structures being welded), a laser beam may be projected into a space 145 adjacent a lower end 152 of rotating shielding device 100.

Rotating portions 122, which also may be referred to as wheels 122, generally may extend from upper end 148 to lower end 152 and may be arranged such that they are parallel to one another. Rotating portions 122 may be circular, as shown in FIG. 5, or may have any shape configured to allow rotating portions 122 to be rotated along the surface of a structure being welded. For example, rotating portions 122 may be oval, cam-shaped, irregularly-shaped, sinusoidal, undulating, and/or may be polygonal, where the ease of rotation generally increases with the number of sides of the polygon. Contact surfaces 123*a*, 123*b* of first and second rotating portions 122*a*, 122*b*, respectively, may be configured to engage and roll along structures being welded. For example, first contact surface 123*a* may engage (e.g., be rolled or rotated along the length of) a first structure (e.g., first structure 14*a* of FIG. 4), and second contact surface 123*b* may engage a second structure (e.g., second structure 14*b* of FIG. 4), where the first and second structures are being welded together along a seam between the two. Rotating shielding device 100 may be positioned such that the seam where the first and second structures meet is positioned between first rotating portion 122*a* and second rotating portion 122*b* (e.g., such that body 101 straddles the seam).

First and/or second rotating portions 122*a*, 122*b* may include bushings, fittings, or bearings 156 inserted within a central bore 126, such as to provide a desired fit around axle 128 and provide for rotation of rotating portions 122*a*, 122*b* about axle 128.

Rotating shielding device 100 may be constructed of any suitable materials. For example, rotating shielding device 100 may comprise metals, metal alloys, polymers, fabrics, composites, coatings, ceramics, wood, glass, and/or combinations thereof. Rotating shielding device 100 may be formed of a single integral body in some examples. Additionally or alternatively, some or all of rotating shielding device 100 may be formed of components that are coupled together, such as by welding, adhesion, fasteners, magnets, and/or otherwise coupled together.

Figure 6:
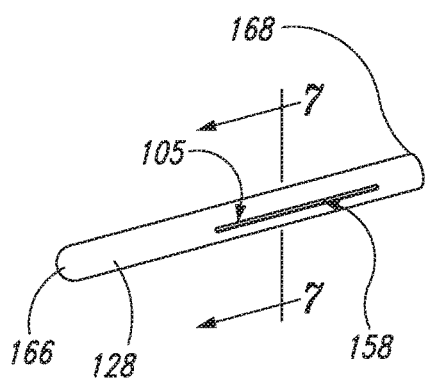
FIG. 6 is a perspective view of an illustrative, non-exclusive example of an axle having a longitudinally extending slot according to the present disclosure.
Figure 7:
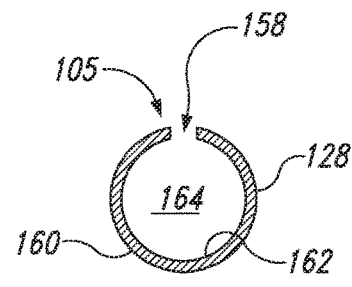
FIG. 7 is a cross-sectional view of the axle of FIG. 6, taking along line 7-7 in FIG. 6.

FIGS. 6-7 show an illustrative, non-exclusive example of an axle 128 of rotating shielding devices 100 of the present disclosure. Axle 128 may include an outlet 105 in the form of an axially extending longitudinal slot 158. As best seen in FIG. 7, which shows a cross-sectional view of axle 128 taken along line 7-7 in FIG. 6, axle 128 may be formed of a hollow, substantially cylindrical tube, with an outer surface 160 and an inner surface 162 defining an interior space 164 for receiving shielding gas therethrough. Outlet 105 (e.g., slot 158) may provide an opening for a shielding gas within interior space 164 of axle 128 to exit axle 128. For example, as used in presently disclosed rotating shielding devices 100, shielding gas may exit slot 158 into one of chambers 136 of central portion 124 (FIG. 5). While FIGS. 6-7 illustrate one outlet 105 (e.g., one axially extending longitudinal slot 158), axles 128 may include outlets 105 of different shapes and configurations, and/or axles 128 may include more than one outlet 105 (e.g., more than one axially extending longitudinal slot 158) in some examples.

As seen in FIG. 6, axle 128 may be closed at a second end 166 while a first end 168 may be open for receiving shielding gas into axle 128. For example, an open first end 168 of axle 128 may serve as an inlet (e.g., inlet 103 of FIG. 4) for receiving shielding gas into axle 128. In this manner, shielding gas within axle 128 may remain within interior space 164 (FIG. 7) of axle 128 until it exits through slot 158 (e.g., shielding gas may be prevented from exiting axle 128 through closed second end 166). Open first end 168 of axle 128 may be coupled to a supply tube (e.g., supply tube 120 of FIG. 2) for supplying shielding gas from a gas supply (e.g., shielding gas supply 118 of FIG. 2).

Figure 8:
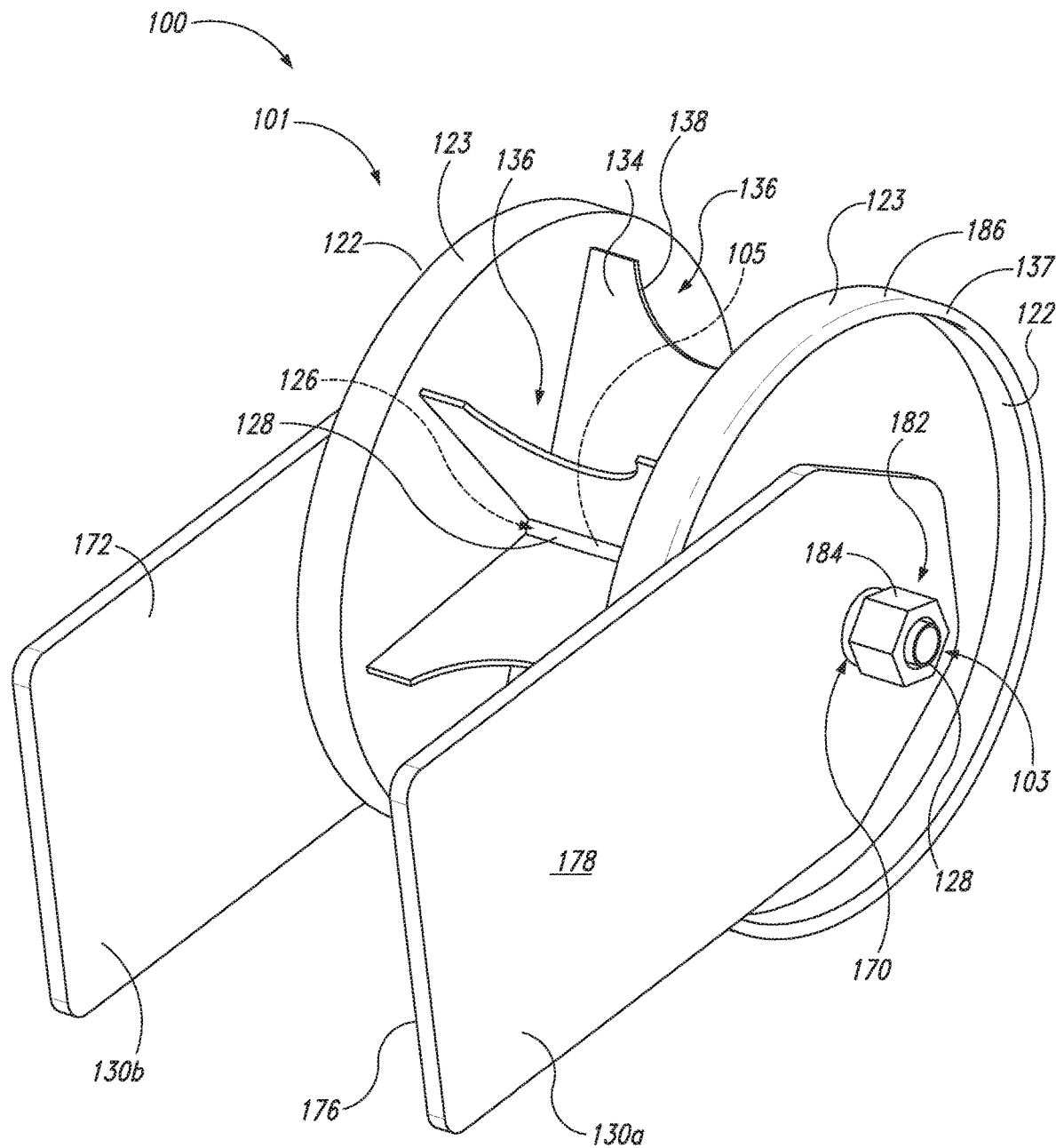
FIG. 8 is a perspective view of an illustrative, non-exclusive example of a rotating shielding device coupled to two frame members according to the present disclosure.

FIG. 8 shows an exemplary, non-exclusive example of a rotating shielding device 100 coupled to frame members 130 (e.g., first frame member 130*a* and second frame member 130*b*) in accordance with the present disclosure. Frame members 130 also may be referred to as handles, support members, and/or support frames 130. As shown in FIG. 8, body 101 of rotating shielding device 100 may be positioned between inner surface 176 of first frame member 130*a* and inner surface 172 of second frame member 130*b*. Frame members 130 may be configured with respect to rotating shielding device 100 such that exerting a force on frame members 130 may cause rotating portions 122 to rotate about axle 128.

In some examples, frame members 130 may be configured to substantially prevent rotation of axle 128 with respect to body 101. For example, first frame member 130*a* may include a through-hole 170 for receiving axle 128 therethrough. Through-hole 170 may extend from an outer surface 178 of first frame member 130*a* to inner surface 176 of first frame member 130*a*. Through-hole 170 may be sized to provide a friction fit, press fit, or interference fit with axle 128 such that axle 128 may be substantially prevented from rotating within through-hole 170. In other words, axle 128 may be substantially stationary with respect to first frame member 130*a*. In this manner, outlet 105 of axle 128 may be oriented facing the weld pool of the weld joint being formed, such orientation of outlet 105 being independent of rotation of body 101 about axle 128.

A portion 182 of axle 128 may extend beyond outer surface 178 of first frame member 130*a* in some examples. This portion 182 of axle 128 may be configured to function as a coupling 184 and/or to receive one or more components, such as bearings and/or fittings thereon, such as for coupling a shielding gas supply tube (e.g., supply tube 120 of FIG. 4) to inlet 103 of axle 128. Additionally or alternatively, coupling 184 may, for example, be configured to secure axle 128 with respect to frame members 130*a*, 130*b*.

Frame members 130*a*, 130*b* may be any suitable shape or configuration. In some examples, frame members 130 may be configured to be operated manually. For example, an operator may directly hold frame members 130 and push or pull on frame members 130, thereby causing rotation of rotating portions 122 operatively coupled thereto, and resulting in movement of the rotating shielding device body 101 and frame members 130 along a weld joint as it is being formed. In some examples, frame members 130 may be indirectly controlled by an operator, such as by being coupled to one or more interfacing mechanisms, and/or tele-operated by a remote controller. In some examples, frame members 130 may be robotically controlled and/or automated.

Frame members 130 may be any suitable material, such as metals, metal alloys, polymers, fabrics, composites, coatings, ceramics, wood, glass, and/or combinations thereof. Frame members 130 may be formed of the same material as the body 101 of rotating shielding devices 100 according to the present disclosure, and/or may include additional and/or different materials. Frame members 130 may be any suitable shape and are not limited to the particular configuration illustrated. In some examples, frame members 130 may be configured such that an operator may control both first frame member 130a and second frame member 130b with a single hand. Generally, frame members 130 may be configured so as to avoid interference with a laser beam being directed at one or more structures to form the weld joint. For example, frame members 130 may be arranged so they do not cross central portion 124 of rotating shielding device 100.

As shown in FIG. 8, one or more of rotating portions 122 may include a seal, or coating, 186 that may define at least a portion of the contact surfaces 123. Coating 186 may include any desired material or materials, such as materials that increase friction, decrease friction, increase stability of a rotating shielding device, increase rigidity of a rotating shielding device, increase precision of a rotating shielding device, ease rotation of a rotating shielding device along one or more structures, smooth the contact surfaces 123 of rotating portions 122, improve aesthetics of a rotating shielding device, add cushioning to a rotating shielding device, and/or protect structure surfaces from damage from rotating portions 122. Coatings 186 may include paint, seals, silicone, polymers, tape, rubber, and/or any other suitable materials.

Figure 9:
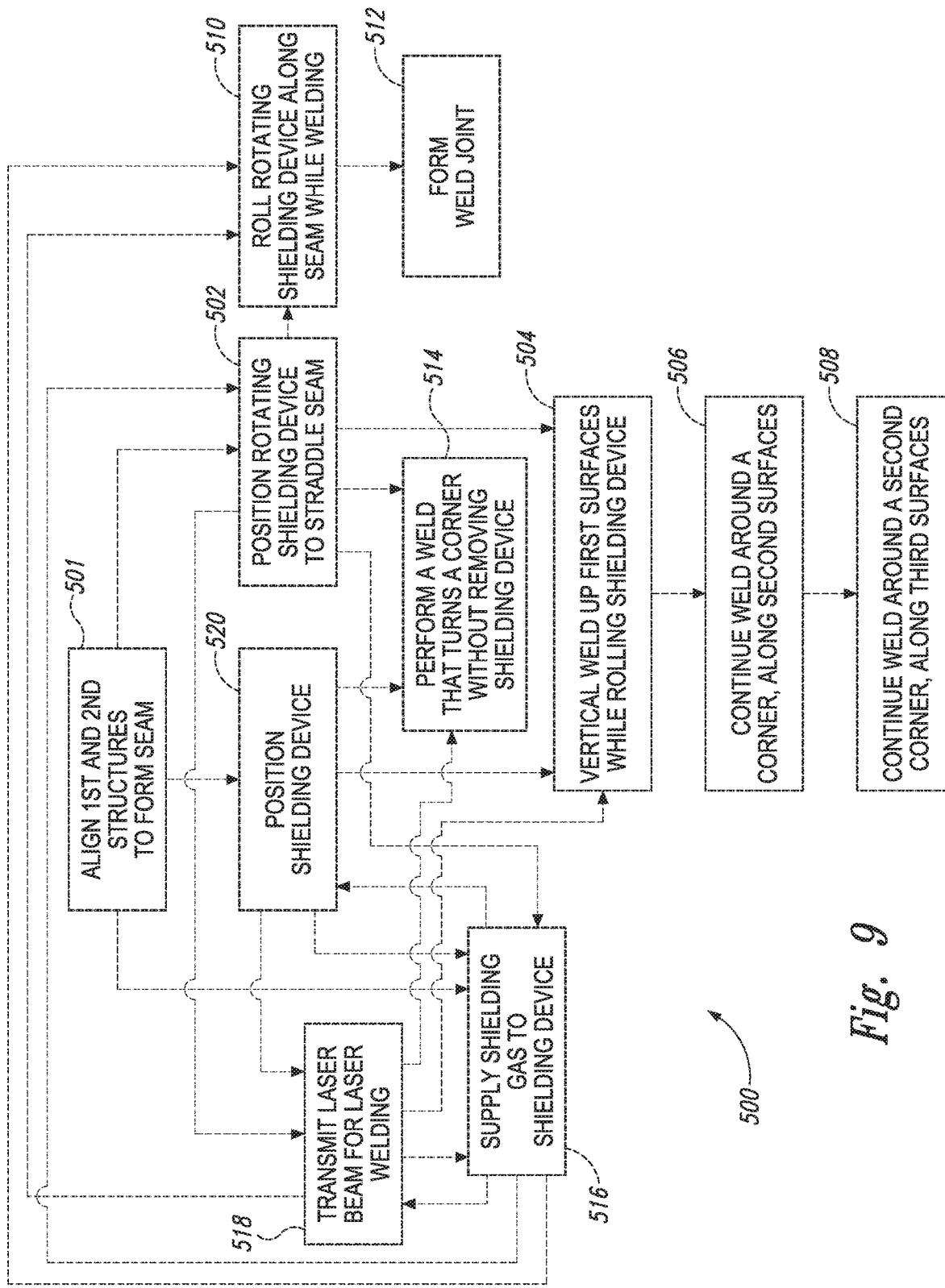
FIG. 9 is a schematic flow diagram of presently disclosed methods of forming a weld joint using a rotating shielding device according to the present disclosure.

FIG. 9 schematically provides a flowchart that represents illustrative, non-exclusive examples of methods 500 of welding according to the present disclosure. In FIG. 9, steps are illustrated in dashed boxes indicating that such steps may be optional or may correspond to an optional version of a method according to the present disclosure. The methods and steps illustrated in FIG. 9 are not limiting and other methods and steps are within the scope of the present disclosure, including methods having greater than or fewer than the number of steps illustrated, as understood from the discussions herein.

As compared with the prior art method 300 shown in FIG. 3, methods 500 illustrated in FIG. 9 according to the present disclosure may be more efficient, with fewer steps to the same result (e.g., a completed vertical weld joint). In some methods 500, first and second structures may be aligned with respect to one another at 501 to form a seam to be welded, and a rotating shielding device (e.g., rotating shielding device 100 of FIG. 8) may be positioned at 502 to straddle the seam between two structures to be welded (e.g., seam 16 of structures 14a, 14b of FIG. 4). The rotating shielding device may be rolled along the structures being welded at 510, thereby forming a weld joint between the two structures at 512. Rolling a rotating shielding device at 510 may include exerting a force on the one or more frame members (e.g., frame members 130 of FIG. 8) to cause rotation of the first rotating portion and the second rotating portion (e.g., first and second rotating portions 122a, 122b of FIG. 5) about the axle (e.g., axle 128 of FIG. 4). Additionally or alternatively, rolling a rotating shielding device at 510 may include supplying the seam with shielding gas (e.g., shielding gas 102 from shielding gas supply 118) as the rotating shielding device is being rolled along the structures.

Rotating shielding devices according to the present disclosure may be rolled along any seam being welded, however in specific examples, rotating shielding devices according to the present disclosure may, at 514, be used to perform a weld that turns a corner without requiring that the rotating shielding device be removed from the seam and repositioned. For example, presently disclosed rotating shielding devices may be rolled along a continuous seam weld that begins with welding in a first direction and changes to a second direction at a corner.

In more specific examples, presently disclosed rotating shielding devices may be used to continuously supply shielding gas to a seam being vertically welded (e.g., turning a three dimensional corner). For example, once a rotating shielding device is positioned to straddle a seam between two structures being welded at 502, a vertical weld may be performed at 504, such as by welding a seam upwards along first surfaces of two structures while concurrently rolling a rotating shielding device along the seam being welded. At a corner (e.g., at the top of the two structures being welded), the weld may be continued at 506 around the corner and across second surfaces of the two structures being welded. Concurrently, the rotating shielding device may be rolled over or around the corner, and continue to be rolled along the second surfaces. In this manner, the weld may be continued in a second direction and/or second plane without removing the rotating shielding device from the structures (e.g., contact surfaces 123 of rotating shielding device 100 of FIG. 4 remain in contact with structures 14).

Likewise, at a second corner (e.g., the corner between the top surfaces and the rear surfaces of two structures being welded), the weld may be continued at 508 around the second corner and along third surfaces of the two structures being welded. Again, concurrently, the rotating shielding device may be rolled over or around the second corner, and continue to be rolled along the third surfaces, thereby completing a vertical weld without removing the rotating shielding device from the structures being welded.

Aligning first and second structures with respect to one another at 501 may, in some examples, include positioning the first structure adjacent the second structure to form the seam, wherein the first structure comprises a first face (e.g., front surface 30a) and a second face (e.g., top surface 32a) and the second structure comprises a third face (e.g., front surface 30b) and a fourth face (e.g., top surface 32b). The first face and the second face may be arranged at a first angle with respect to one another (e.g., may form a three-dimensional corner), and the third face and the fourth face may be arranged at a second angle with respect to one another. The positioning the first structure adjacent the second structure at 501 may thus include aligning the first structure and the second structure such that the first face and the third face are adjacent each other and such that the second face and the fourth face are adjacent each other, such that the seam is formed continuously along the first and third faces and continues along the second and fourth faces.

Methods 500 may include supplying a shielding gas at 516 and/or transmitting a laser beam for laser welding at 518. For example, supplying a shielding gas at 516 may include operatively coupling a supply of shielding gas (e.g., supply 118 of FIG. 4) to a rotating shielding device, such as to an inlet of an axle of the rotating shielding device (e.g., inlet 103 of axle 128 of FIG. 4). Transmitting a laser beam at 518 may include positioning a laser beam welding device (e.g., laser beam welding device 106 of FIG. 4) such that a laser beam (e.g., laser beam 108 of FIG. 4) may be transmitted to a seam formed between two structures to be welded to effectuate a laser weld between the two structures. Transmitting the laser beam at 518 may include moving the laser beam focus head (e.g., laser beam focus head 110 of FIG. 4) along the seam to form a continuous seam laser weld along the seam between the two structures.

Some methods 500 described above in connection with positioning rotating shielding devices of the present disclosure at 502 may be performed using shielding devices other than rotating shielding devices according to the present disclosure. For example, in some methods, a shielding device may be positioned with respect to a seam formed between a first and second structure to be welded at 520.

Such shielding devices positioned at 520 may be used to perform a weld that turns a corner at 514 without removing the shielding device from the structures being welded. In other examples, shielding devices positioned at 520 may be used to perform a vertical weld up first surfaces of two structures at 504, continuing the weld around a first corner at 506, and further continuing the weld around a second corner at 508 to complete the vertical weld. Thus, methods 500 generally may include performing a weld that turns one or more corners without removing the shielding device without necessarily utilizing presently disclosed rotating shielding devices.

Illustrative, non-exclusive examples of inventive subject matter according to the present disclosure are described in the following enumerated paragraphs:

A1. A rotating shielding device for laser welding a seam between a first structure and a second structure, comprising:
 a body configured to straddle the seam, the body including:
  a first rotating portion and a second rotating portion spaced apart from the first rotating portion, the first rotating portion including a first contact surface for engaging and rolling along the first structure and the second rotating portion including a second contact surface for engaging and rolling along the second structure; and
  a central portion positioned between and interconnecting the first rotating portion and the second rotating portion; and
 an axle extending through the body, wherein the body is rotationally coupled to the axle, the axle including an inlet for receiving shielding gas and an outlet positioned to direct the shielding gas at the seam when the body is caused to roll along the first structure and the second structure.

A1.1. The rotating shielding device of paragraph A1, wherein the central portion includes one or more partitions extending axially between the first rotating portion and the second rotating portion and extending radially from adjacent the axle.

A1.2. The rotating shielding device of paragraph A1.1, wherein each of the one or more partitions extends radially from adjacent the axle to a curved edge, each curved edge not extending beyond the first contact surface or the second contact surface.

A2. The rotating shielding device of any of paragraphs A1.1-A1.2, wherein each of the one or more partitions defines a respective open space configured to allow transmission of a laser beam to the seam when the body is rolling along the first structure and the second structure.

A2.1. The rotating shielding device of paragraphs A1.2 and A2, wherein each curved edge defines each open space.

A3. The rotating shielding device of any of paragraphs A1-A2.1, wherein the one or more partitions comprise six partitions equally spaced apart about the axle within the central portion.

A4. The rotating shielding device of any of paragraphs A1.1-A3, wherein the one or more partitions comprise a plurality of partitions, and wherein the plurality of partitions defines a plurality of chambers, each respective chamber being formed between respective two adjacent partitions of the plurality of partitions, each respective chamber defining a chamber volume between the axle, the first rotating portion, the second rotating portion, and the respective two adjacent partitions.

A5. The rotating shielding device of any of paragraphs A1-A4, wherein the first rotating portion and the second rotating portion are circular.

A6. The rotating shielding device of any of paragraphs A1-A5, wherein the first rotating portion and the second rotating portion are polygonal.

A7. The rotating shielding device of any of paragraphs A1-A6, wherein one or both of the first rotating portion and second rotating portion include(s) a seal that defines at least a portion of the first contact surface and second contact surface.

A8. The rotating shielding device of any of paragraphs A1-A7, wherein the axle comprises a hollow axle.

A9. The rotating shielding device of any of paragraphs A1-A8, wherein the outlet comprises an axially extending longitudinal slot formed along the axle.

A10. The rotating shielding device of any of paragraphs A1-A9, wherein the outlet comprises one or more holes formed in the axle.

A11. The rotating shielding device of any of paragraphs A1-A10, wherein the inlet comprises an open first end of the axle.

A12. The rotating shielding device of any of paragraphs A1-A11, wherein the axle comprises a closed second end configured to prevent escape of shielding gas therethrough.

A13. The rotating shielding device of any of paragraphs A1-A12, further comprising:
 a support frame operatively coupled to the axle.

A14. The rotating shielding device of paragraph A13, wherein the support frame is configured to restrict rotation of the axle to maintain the outlet positioned to direct the shielding gas at the seam as the first rotating portion and the second rotating portion are caused to roll along the first structure and the second structure.

A15. The rotating shielding device of any of paragraphs A13-A14, wherein the support frame is robotically controlled.

B1. A system for forming a weld joint, comprising:
 the rotating shielding device according to any of paragraphs A1-A15; and
 a supply of shielding gas operatively connected to the inlet of the axle.

B2. The system of paragraph B1, wherein the supply of shielding gas includes one or more of helium, argon, carbon dioxide, oxygen, nitrogen, hydrogen, nitric oxide, sulfur hexafluoride, and dicholorofluoromethane.

B3. The system of any of paragraphs B1-132, wherein a first portion of the supply of shielding gas is positioned within the axle.

B4. The system of any of paragraphs B1-133, wherein a second portion of the supply of shielding gas is positioned apart from the rotating shielding device.

B5. The system of any of paragraphs B1-B4, further comprising a shielding gas supply tube operatively connecting the supply of shielding gas to the inlet of the axle.

B6. The system of any of paragraphs B1-B5, further comprising a laser beam welding device positioned relative to the seam such that the laser beam welding device is configured to deliver a laser beam to effectuate a laser weld joint along the seam.

C1. A weld joint formed by the system of any of paragraphs B1-136.

D1. A part including a weld joint of paragraph C1.

D2. The part of paragraph D1, wherein the part comprises tooling for a mold.

D3. The part of paragraph D2, wherein the part comprises tooling for a mold for a composite part.

D4. The part of paragraph D3, wherein the part comprises tooling for a mold for a composite part for an aircraft.

D5. The part of any of paragraphs D1-D4, wherein the part includes at least one of an aircraft, an aircraft component, an automobile, an automotive component, a spacecraft, a spacecraft component, a watercraft, a watercraft component, a land vehicle, a land vehicle component, a wind turbine, a wind turbine component, a structural tower, a structural tower component, a mast, a mast component, a bridge, and a bridge component.

E1. A method of forming a weld joint along an interface between a first structure and a second structure, comprising:

positioning the first structure adjacent the second structure to form the interface, wherein the first structure comprises a first face and a second face, the first face and the second face being arranged at a first angle with respect to one another, wherein the second structure comprises a third face and a fourth face, the third face and the fourth face being arranged at a second angle with respect to one another, and wherein the positioning the first structure adjacent the second structure comprises aligning the first structure and the second structure such that the first face and the third face are adjacent each other and such that the second face and the fourth face are adjacent each other, such that the interface is formed continuously along the first and third faces and continues along the second and fourth faces;

supplying a shielding gas to a shielding device;

welding the interface along the first structure and the second structure; and concurrently with the welding, moving the shielding device along the interface as the weld joint is being formed along the interface, wherein, during the moving, the shielding device remains in contact with the first structure and the second structure for the duration of formation of the weld joint.

E2. The method of paragraph E1, wherein the shielding device comprises the rotating shielding device of any of paragraphs A1-A15.

E3. The method of any of paragraphs E1-E2, further comprising using the system of any of paragraphs B1-137.

E4. The method of any of paragraphs E1-E3, wherein the weld joint is a laser weld joint.

E5. The method of any of paragraphs E1-E4, wherein the weld joint is a continuous weld joint.

E6. The method of any of paragraphs E1-E5, wherein the weld joint is a vertical weld joint.

E7. The method of any of paragraphs E1-E6, wherein the first angle is one of acute, obtuse, and 90°.

E8. The method of any of paragraphs E1-E7, wherein the second angle is one of acute, obtuse, and 90°.

E9. The method of any of paragraphs E1-E8, wherein the first angle is equal to the second angle.

F1. A method of welding, the method comprising:

rolling the first rotating portion and the second rotating portion of the rotating shielding device of any of paragraphs A1-A15 along the first structure and the second structure, respectively;

supplying shielding gas to the inlet of the axle; and forming a weld joint along the seam between the first structure and the second structure.

F2. The method of paragraph F1, wherein the forming the weld joint comprises transmitting a laser beam to the seam, thereby effectuating a weld joint along the seam.

F3. The method of any of paragraphs F1-F2, wherein the first contact surface remains in contact with the first structure and the second contact surface remains in contact with the second structure during the forming the weld joint along the seam.

F4. The method of any of paragraphs F1-F3, wherein the forming the weld joint comprises forming a vertical weld joint.

F5. The method of any of paragraphs F1-F4, wherein the forming the weld joint comprises forming a continuous weld joint in at least two different directions.

F6. The method of any of paragraphs F1-F5, wherein the forming the weld joint comprises forming a continuous weld joint in at least two different planes.

F7. The method of any of paragraphs F1-F6, wherein the rolling the first rotating portion and the second rotating portion comprises rotating the central portion about the axle.

F8. The method of any of paragraphs F1-F7, wherein the rotating shielding device comprises one or more frame members coupled to at least one of the body and the axle, and wherein the rolling the first rotating portion and the second rotating portion comprises exerting a force on the one or more frame members to cause rotation of the first rotating portion and the second rotating portion about the axle.

G1. The use of the rotating shielding device of any of paragraphs A1-A15 to supply a shielding gas to a seam being welded.

H1. The use of the system of any of paragraphs B1-B6 to form a weld joint.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of forming a weld joint along a seam between a first structure and a second structure, comprising:

positioning the first structure adjacent the second structure to form the seam, wherein the first structure comprises a first face and a second face, the first face and the second face being arranged at a first angle with respect to one another, wherein the second structure comprises a third face and a fourth face, the third face and the fourth face being arranged at a second angle with respect to one another, and wherein the positioning the first structure adjacent the second structure comprises aligning the first structure and the second structure such that the first face and the third face are adjacent each other and such that the second face and the fourth face are adjacent each other, such that the seam is formed continuously along the first and third faces and continues along the second and fourth faces;

supplying a shielding gas to a shielding device;

welding the seam along the first structure and the second structure; and concurrently with the welding, moving the shielding device along the seam by rotating the shielding device relative to the first structure and the second structure as the weld joint is being formed along the seam, wherein, during the moving, the shielding device remains in contact with the first structure and the second structure for the duration of formation of the weld joint, wherein the weld joint is a vertical weld joint, and wherein the moving the shielding device along the seam comprises moving the shielding device vertically by rotating the shielding device relative to the first structure and the second structure.

2. The method according to claim 1, wherein the welding the seam comprises laser welding.

3. The method according to claim 1, wherein the weld joint is a continuous weld joint.

4. The method according to claim 1, wherein the first angle is substantially equal to the second angle.

5. The method according to claim 1, wherein the first angle is 90° and wherein the second angle is 90°, such that the first structure and the second structure form a three dimensional corner.

6. The method according to claim 1, wherein the shielding device comprises an axle having an inlet configured to receive the shielding gas and an outlet configured to direct the shielding gas at the seam during the moving the shielding device.

7. The method according to claim 1, wherein the moving the shielding device along the seam comprises moving a portion of the shielding device linearly with respect to the seam, such that the portion of the shielding device is oriented to deliver the shielding gas to the seam during the welding the seam.

8. The method according to claim 1, wherein the shielding device comprises:

a body configured to straddle the seam, the body including:

a first rotating portion and a second rotating portion spaced apart from the first rotating portion, the first rotating portion including a first contact surface configured to engage and roll along the first structure and the second rotating portion including a second contact surface configured to engage and roll along the second structure; and a central portion positioned between and interconnecting the first rotating portion and the second rotating portion; and an axle extending from the first rotating portion to the second rotating portion, wherein the axle extends through the central portion of the body, at least partially through a first central bore of the first rotating portion, and at least partially through a second central bore of the second rotating portion, wherein the body is rotationally coupled to the axle such that the first rotating portion and the second rotating portion are configured to rotate around the axle and such that the axle does not rotate when the first contact surface is rolled along the first structure and the second contact surface is rolled along the second structure, parallel to the seam, wherein the axle includes an inlet configured to receive a shielding gas and an outlet configured to direct the shielding gas at the seam between the first rotating portion and the second rotating portion, when the body is caused to roll along the first structure and the second structure.

9. A method of welding, the method comprising:

positioning a rotating shielding device with respect to a seam between a first structure and a second structure;

rotating the rotating shielding device with respect to the first structure and the second structure;

supplying a shielding gas to an inlet of an axle of the rotating shielding device; and forming a weld joint along the seam between the first structure and the second structure.

10. The method according to claim 9, wherein the rotating shielding device comprises:

a body configured to straddle the seam, the body including:

a first rotating portion and a second rotating portion spaced apart from the first rotating portion, the first rotating portion including a first contact surface for engaging and rolling along the first structure and the second rotating portion including a second contact surface for engaging and rolling along the second structure; and a central portion positioned between and interconnecting the first rotating portion and the second rotating portion; and the axle, wherein the axle extends through the body, wherein the body is rotationally coupled to the axle, the axle further including an outlet positioned to direct the shielding gas at the seam when the body is caused to roll along the first structure and the second structure, wherein the positioning the rotating shielding device comprises positioning the body such that it straddles the seam, and wherein the supplying the shielding gas is performed simultaneously with the rotating the rotating shielding device.

11. The method according to claim 10, wherein the rotating the rotating shielding device comprises rolling the first rotating portion and the second rotating portion of the rotating shielding device along the first structure and the second structure, respectively.

12. The method according to claim 11, wherein the rolling the first rotating portion and the second rotating portion comprises rotating the central portion about the axle.

13. The method according to claim 11, wherein the rotating shielding device comprises one or more support frames coupled to at least one of the body and the axle, and wherein the rolling the first rotating portion and the second rotating portion comprises exerting a force on the one or more support frames to cause rotation of the first rotating portion and the second rotating portion about the axle.

14. The method according to claim 10, wherein the first contact surface remains in contact with the first structure and the second contact surface remains in contact with the second structure during the forming the weld joint along the seam.

15. The method according to claim 9, wherein the forming the weld joint comprises forming a vertical weld joint.

16. The method according to claim 9, wherein the forming the weld joint comprises transmitting a laser beam to the seam, thereby effectuating a weld joint along the seam.

17. The method according to claim 9, wherein the forming the weld joint comprises forming a continuous weld joint in at least two different directions.

18. The method according to claim 9, wherein the forming the weld joint comprises forming a continuous weld joint in at least two different planes.

19. A method of forming a weld joint along a seam between a first structure and a second structure, comprising:
    positioning the first structure adjacent the second structure to form the seam, wherein the first structure comprises a first face and a second face, the first face and the second face being arranged at a first angle with respect to one another, wherein the second structure comprises a third face and a fourth face, the third face and the fourth face being arranged at a second angle with respect to one another, and wherein the positioning the first structure adjacent the second structure comprises aligning the first structure and the second structure such that the first face and the third face are adjacent each other and such that the second face and the fourth face are adjacent each other, such that the seam is formed continuously along the first and third faces and continues along the second and fourth faces;
    supplying a shielding gas to an inlet of an axle of a shielding device;
    welding the seam along the first structure and the second structure; and
    concurrently with the welding, moving the shielding device along the seam as the weld joint is being formed along the seam, wherein, during the moving, the shielding device remains in contact with the first structure and the second structure for the duration of formation of the weld joint.

20. The method according to claim 19, wherein the moving the shielding device along the seam comprises moving a portion of the shielding device linearly with respect to the seam, such that the portion of the shielding device is oriented to deliver the shielding gas to the seam during the welding the seam.

* * * * *